Oct. 30, 1934.  O. E. HARRIS  1,978,942
ICE CREAM DIPPER
Filed Oct. 20, 1933
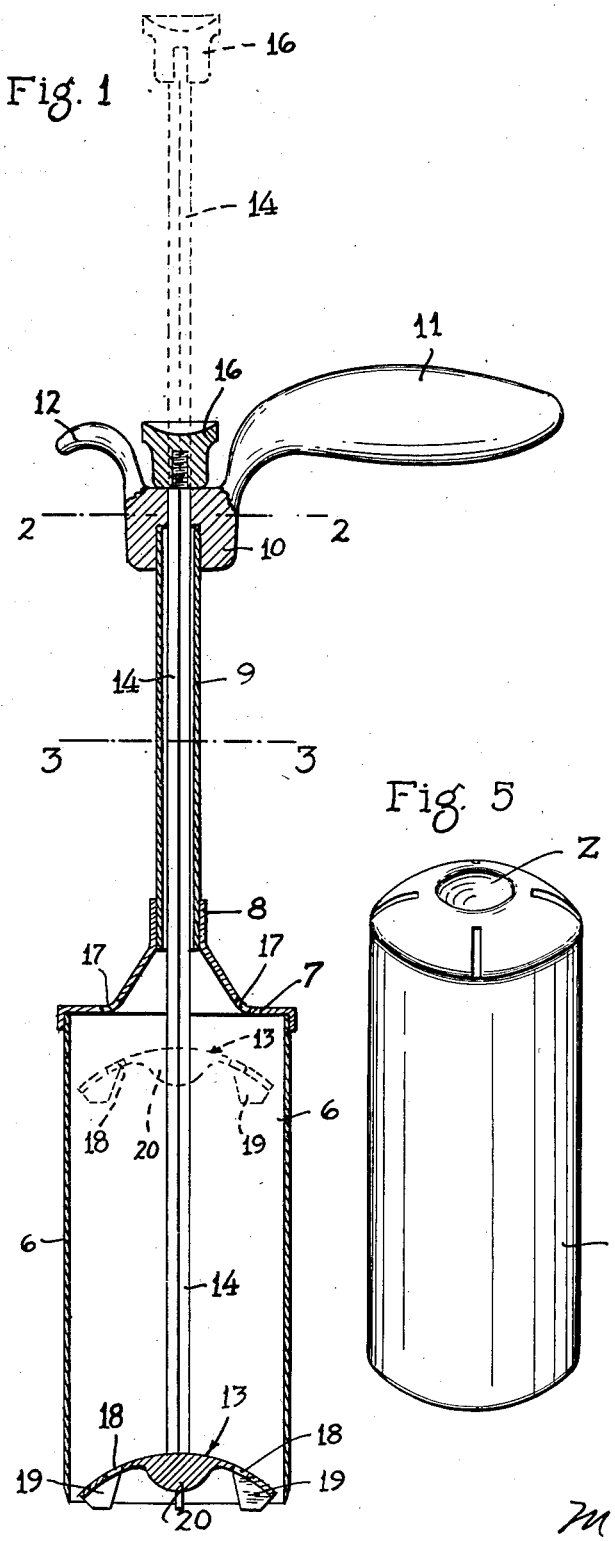
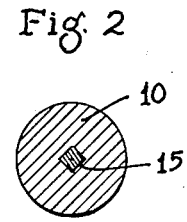
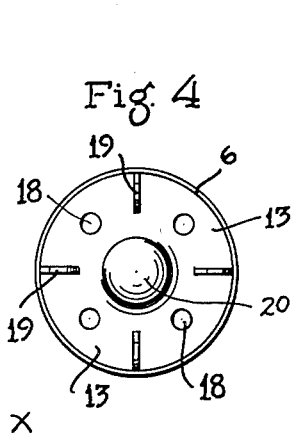
INVENTOR
ORA E. HARRIS
BY HIS ATTORNEYS Patented Oct. 30, 1934

1,978,942

UNITED STATES PATENT OFFICE 1,978,942

ICE CREAM DIPPER

Ora E. Harris, Kearney, Nebr.

Application October 20, 1933, Serial No. 694,460

3 Claims. (Cl. 107—48)

My present invention relates to ice cream dippers for molding and dispensing ice cream taken from bulk ice cream as the same is received in large receptacles from the place of manufacture and is in the nature of an improvement on or a refinement of the invention disclosed and claimed in United States Letters Patent No. 1,896,083 issued to me of date February 7, 1933.

One of the objects of this invention is to provide positive means for causing a cake of ice cream in the dipper to turn therewith, when said dipper is turned in bulk ice cream into which it has been pressed, to break said cake from the bulk.

A further object of the invention is to give the top portion of the cake of ice cream a novel appearance and form therein a seat or cavity in which may be placed a piece of candy, fruit or the like after the cake has been removed from the dipper.

A still further object of the invention is the provision of an ejector that will prevent the formation of a partial vacuum therein, at the time the dipper is pressed into bulk ice cream, for the purpose of filling the same. The formation of a partial vacuum in the ejector tends to prevent free release of the cake therefrom with the result that the said cake, at its contact with the ejector, is often broken thus marring the appearance thereof.

To the above end, generally stated, the invention consists of the novel devices and combinations of devices hereinafter described and defined in the claims.

In the accompanying drawing, which illustrates the invention, like characters indicate like parts throughout the several views.

Referring to the drawing:

Fig. 1 is a view of the improved dipper principally in central vertical section with some parts shown in different positions by means of broken lines;

Figs. 2 and 3 are views in transverse section taken on the lines 2—2 and 3—3 of Fig. 1, respectively;

Fig. 4 is a bottom plan view of the ejector removed from the dipper; and

Fig. 5 is a perspective view of a cake of ice cream formed by the improved dipper.

The improved dipper includes a cylindrical cup 6 having a cutting edge at its open bottom. A top 7 is applied to the upper end of the cup 6 and provided with an upwardly and inwardly contracted central portion that terminates in an upstanding tubular neck 8 aligned with said cup.

The lower end of a tubular stem 9 is fitted in the neck 8 and rigidly secured thereto. Capping the upper end of the stem 9 is a cylindrical head 10 that is rigidly secured thereto and provided with a radially projecting hand grip 11 and a diametrically opposite finger-piece 12.

Within the cup 6 is a reciprocatory ejector 13 which, as shown, has a disc-like body with a convex upper face and a concave lower face. This ejector 13 is rigidly secured at its axis to the lower end of an ejector rod 14 that extends axially through the stem 9 and a guide hole 15 in the head 10. The ejector rod 14 and guide hole 15 are each square in cross-section and thereby hold the ejector 13 for common turning movement with the cup 6, when said cup is turned about its axis, for a purpose that will hereinafter appear. On the upper end of the ejector rod 14 is a knob 16 by which said rod may be held while reciprocating the ejector 13. The engagement of the knob 16 with the seat between the hand grip and finger piece limits the projecting movement of the ejector 13 in the cup 6 and the hand and fingers of the operator are thus held out of engagement with the operating rod and its knob during normal operation of the dipper.

Air escape holes or passageways 17 and 18 are formed, respectively, in the cup top 7 and the ejector 13. Penetrating blades or members 19 are formed with the ejector 13 and depend from the under or concave face thereof. These penetrating blades 19 extend radially inwardly from the perimeter of the ejector 13 and are circumferentially spaced equi-distances apart. The air holes 18 are formed, as shown, midway between the penetrating blades 19.

Also formed on the under or concave side of the ejector 13, at the center thereof, is a die 20 in the form of a boss from which the penetrating blades 19 are radially spaced at their inner ends.

In dispensing ice cream from bulk ice cream by means of the improved dipper, said dipper is held by means of the hand-piece 11 and the finger-piece 12 and the cup 6 is pressed into the body of ice cream which cuts a cylindrical cake X therefrom, as shown in Fig. 5. The pressure of the cake X, while entering the cup 6, retracts the ejector 13 until the upper convex surface of said ejector is stopped by its engagement with the annular seat formed by the upwardly contracted central portion of the cup top 7. During the final filling of the cup 6 with ice cream, the ejector 13 is held by the cup top 7, which acts as a base of resistance, thus causing the penetrating blades 19 and the die 20 to be pressed into the cake X. This pressure of the ejector 13 against the upper end of the cake X molds the same to convex form, as indicated at Y, and the die 20 forms, at the center of this convex surface, a seat or cavity Z. It will be apparent from the foregoing that the upper convex surface of the ejector cooperates with the annular seat in the top to form a leak-proof valve which prevents the ice cream, when soft, from being forced up over the ejector and into the tubular stem 9 during the final filling of the cup and compacting and shaping of the upper end of the cake of ice cream, resulting in a saving of ice cream and keeping the dipper in sanitary condition.

As the ejector 13 is retracted by the pressure of ice cream therein, air in the cup 6 will escape through the holes 17 and air caged in the concave face of the ejector 13 by the ice cream will escape through the holes 18 into the cup 6 and from thence through the holes 17. At the completion of the filling of the cup 6 with ice cream the dipper, by means of the hand-piece 11, is given a slight turn about its axis in the bulk ice cream to break the cake X at the cutting edge of the cup 6, from the bulk. During the turning of the cup 6 in the bulk ice cream, the penetrating blades 19, which extend into the cake X, will materially assist in holding said cake to turn with the cup 6 and thereby materially assist in breaking the same from the body. After the cake X has been broken from the bulk the dipper is lifted to extract said cake from the body.

To remove the cake X from the cup 6 the ejector rod 14 is operated to move the ejector 13 downwardly in the cup 6 and thereby force said cake therefrom.

As previously stated, a piece of candy or fruit, such as a cherry, may be placed on the cake X in the seat or cavity Z to add to the attractiveness of the confection.

In case the ice cream cake X is to be coated with chocolate, a stick or wooden paddle will be pressed into said cake, preferably while the cake X is in the cup 6, to prevent splitting of said cake. This stick or paddle serves a double purpose; first, it affords convenient means by which the cake X may be held while dipping the same in liquid chocolate to coat the same, and second, it affords convenient means by which said cake may be held while eating the same.

What I claim is:

1. An ice cream dipper comprising a cylindrical cup, a top connected to said cup and having an upwardly and inwardly contracted central portion terminating in a tubular stem, and an ejector having an operating rod reciprocatably mounted in said stem, said ejector having a disk-like body with a convex upper surface adapted to make line contact and seat within the contracted central portion of said top.

2. An ice cream dipper comprising a cylindrical thrust cup, a top connected to said cup and having an upwardly and inwardly contracted central portion terminating in a tubular stem, hand and finger grip pieces extending to opposite sides of said stem, an ejector having an operating rod reciprocatably mounted in said stem, actuating means for said rod extending between said hand and finger grip pieces and engage the upper end of said stem, and said ejector having a disk-like body with a concave lower face and a convex upper face, the upper face of said ejector body being shaped to make line contact with the upwardly contracted central portion of said top and close said portion of the top against entrance of ice cream from said cup.

3. An ice cream dipper comprising a cylindrical cup, the top of which is formed with an upwardly and inwardly contracted central portion terminating in a tubular stem, and an ejector having an operating rod reciprocatably mounted in said stem, said ejector having a body with a generally concave lower face and a generally convex upper face, the convex upper face being shaped to make line contact and seat within the contracted central portion of said top, and a lower central portion of said body being thickened adjacent the inner end of the operating rod to provide a molding piece extending centrally between the concave annular wall of the lower face.

ORA E. HARRIS.